United States Patent [19]

Konishi

[11] Patent Number: 5,142,735
[45] Date of Patent: Sep. 1, 1992

[54] DOOR OPEN POSITION FIXING DEVICE

[75] Inventor: Kazunori Konishi, Hyogo, Japan

[73] Assignee: Kabushiki Kaisha Kobe Seiko Sho, Kobe, Japan

[21] Appl. No.: 700,259

[22] Filed: May 15, 1991

[30] Foreign Application Priority Data

May 15, 1990 [JP] Japan .................. 2-50976 [U]

[51] Int. Cl.$^5$ .............. E05F 5/02; B25J 11/00
[52] U.S. Cl. ................... 16/82; 16/DIG. 7; 901/43
[58] Field of Search ............ 16/82, 84, DIG. 7; 292/201; 901/7, 43; 414/744.1

[56] References Cited

U.S. PATENT DOCUMENTS 4,342,536 8/1982 Akeel et al. ............... 901/43
4,636,136 1/1987 Nomura et al. ............. 414/730

FOREIGN PATENT DOCUMENTS 0160407 11/1985 European Pat. Off. .

Primary Examiner—Robert L. Spruill
Assistant Examiner—Carmine Cuda
Attorney, Agent, or Firm—Oblon, Spivak, McClelland, Maier & Neustadt

[57] ABSTRACT

A door open position fixing device including a presser member adapted to abut against a vehicle door openable up to a predetermined angle defined for every vehicle of different kinds, and a driving mechanism for swingably driving the presser member to make the same press the door in an opening direction thereof and maintain an open condition of the door. The door open position fixing device is provided with a detecting device for detecting a swing degree of the presser member and a control device for controlling the driving mechanism so that the swing degree of the presser member detected by the detecting device becomes equal to a predetermined value preliminarily set for the door of the every vehicle of different kinds.

2 Claims, 5 Drawing Sheets

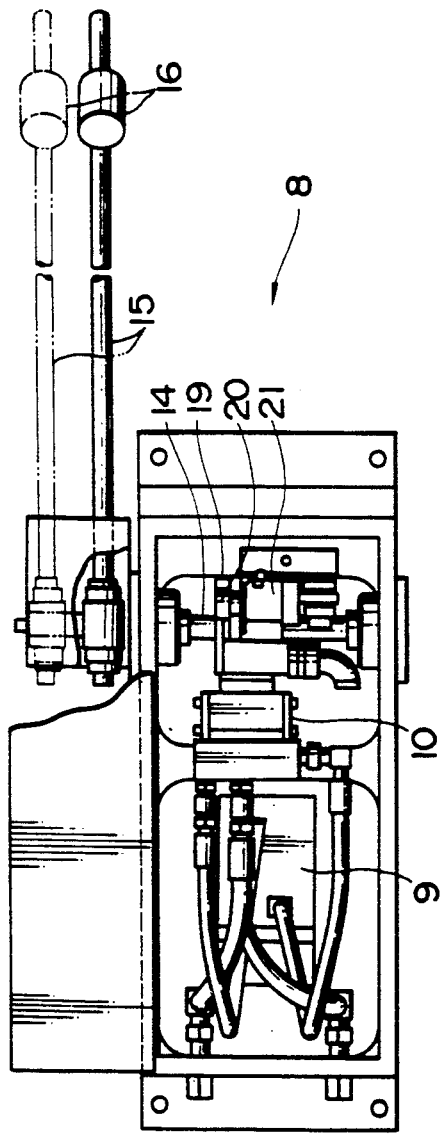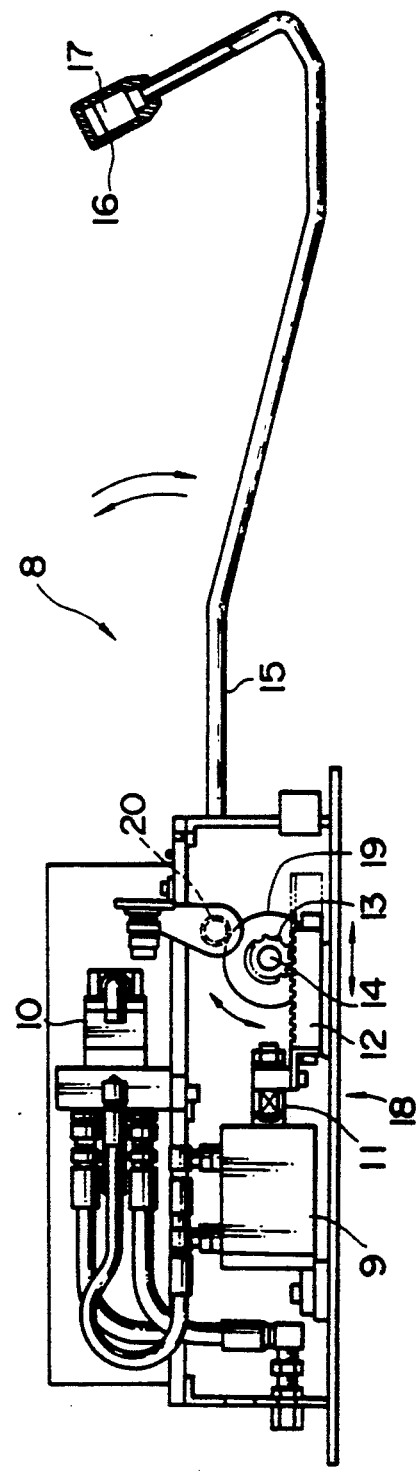
FIG. 1A
FIG. 1B

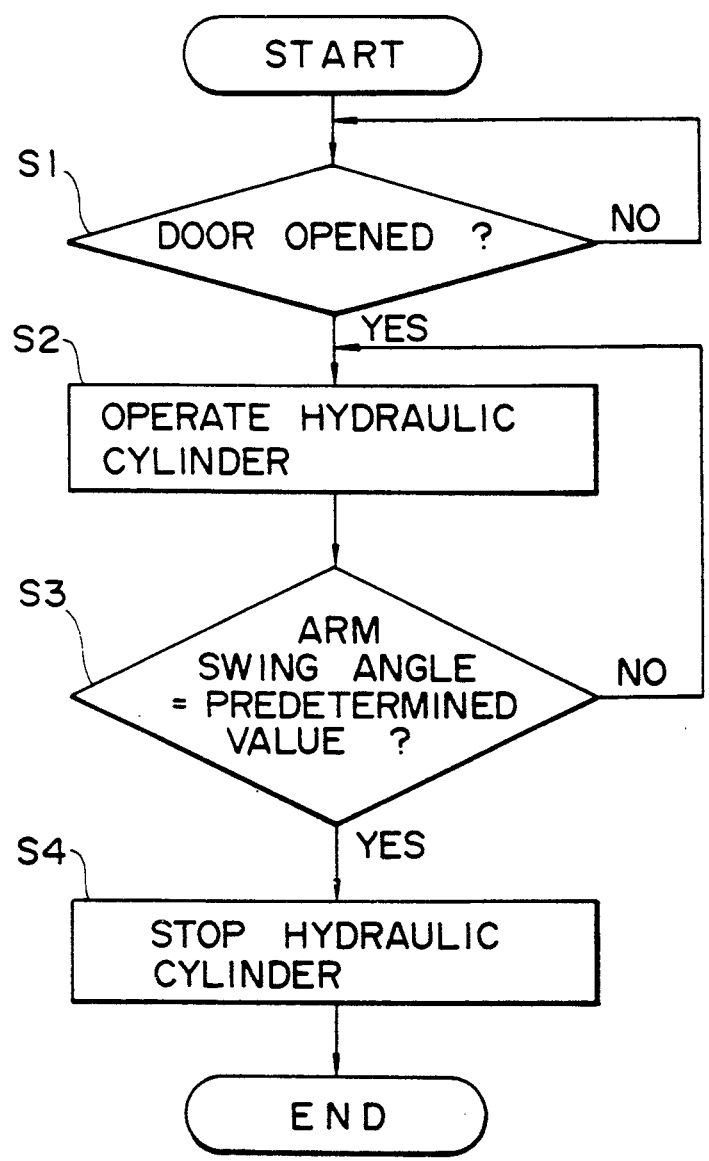

DOOR OPEN POSITION FIXING DEVICE

BACKGROUND OF THE INVENTION

The present invention relates to a device for fixing an open position of a door of an automobile to be used in a painting operation by a robot, for example.

Generally, in a production line of automobiles, when each automobile placed on a carriage is stopped at a given painting position on the production line, a door of the automobile is opened by a robot.

Under the open condition of the door, a door open position fixing device 1 as shown in FIGS. 4A and 4B is used to fix an open position of the door. That is, a door 3 is fixed at its open position by a presser member 2 of the door open position fixing device 1. Thereafter, an inner surface of the door 3 and an inside of the automobile are painted by a painting robot.

More specifically, when a swing lever 6 is driven by a hydraulic cylinder 7 through a rack 4 and a pinion gear 5 to swing upwardly, the presser member 2 mounted at a free end of the swing lever 6 comes to abutment against the inner surface of the door 3 and presses the door 3 in an opening direction thereof, thereby maintaining the open condition of the door 3.

The abutment of the presser member 2 against the door 3 is detected by a proximity switch provided in the presser member In general, an opening angle of the door 3 has a large variation (e.g., 0–100 mm on the side of an opening end of the door 3) due to an assembling error or the like even if the automobiles are of the same kind. Accordingly, the above door open position fixing device 1 is so designed as to urge each door of the automobiles by a relatively large pressing force in accordance with the door having a maximum opening angle (variation in opening angle).

In recent years, a system of assembling many kinds of automobiles on a single production line has been widely adopted in order to improve the efficiency of production. In the case of applying the above-mentioned door open position fixing device to the above system, as the doors of the automobiles of different kinds have different opening angles and mounting structures, it is necessary to urge each door by a maximum pressing force in accordance with some kind of the automobile having a maximum door opening angle, so as to cover all the kinds of the doors and absorb the variation of the opening angle of each door.

However, if each door is urged by such a maximum pressing force to be required, there may arise a problem that some kinds of doors will be broken because all the doors of different kinds have different opening angles and mounting structures as mentioned above.

SUMMARY OF THE INVENTION

It is accordingly an object of the present invention to provide a door open position fixing device which can maintain an open condition of every door of different kinds at an optimum open position in accordance with an opening angle and a mounting structure of every door.

According to the present invention, there is provided in a door open position fixing device including a presser member adapted to abut against a vehicle door openable up to a predetermined angle defined for every vehicle of different kinds, and a driving mechanism for swingably driving said presser member to make the same press said door in an opening direction thereof and maintain an open condition of said door, the improvement comprising detecting means for detecting a swing degree of said presser member, and control means for controlling said driving mechanism so that said swing degree of said presser member detected by said detecting means becomes equal to a predetermined value preliminarily set for said door of said every vehicle of different kinds.

The above-mentioned predetermined value is set to a value such that the open door can be fixed at a position where the variation of the opening angle is at the maximum in each door.

In the door open position fixing device according to the present invention, the swing degree of the presser member adapted to abut against the door opened is detected by the detecting means.

Then, the driving mechanism for swinging the presser member is controlled by the control means so that the swing degree of the presser member detected by the detecting means becomes equal to the predetermined value preliminarily set for every door of different kinds.

Other objects and features of the invention will be more fully understood from the following detailed description and appended claims when taken with the accompanying drawings.

BRIEF DESCRIPTION OF THE DRAWINGS

FIG. 1A is a plan view of the door open position fixing device according to a preferred embodiment of the present invention;

FIG. 1B is a side view of FIG. 1A;

FIG. 3 is a flowchart showing a procedure of maintaining a door at an open position to be carried out by the door open position fixing device;

DETAILED DESCRIPTION OF THE PREFERRED EMBODIMENT

There will now be described a preferred embodiment of the present invention with reference to the accompanying drawings.

Figure 2:
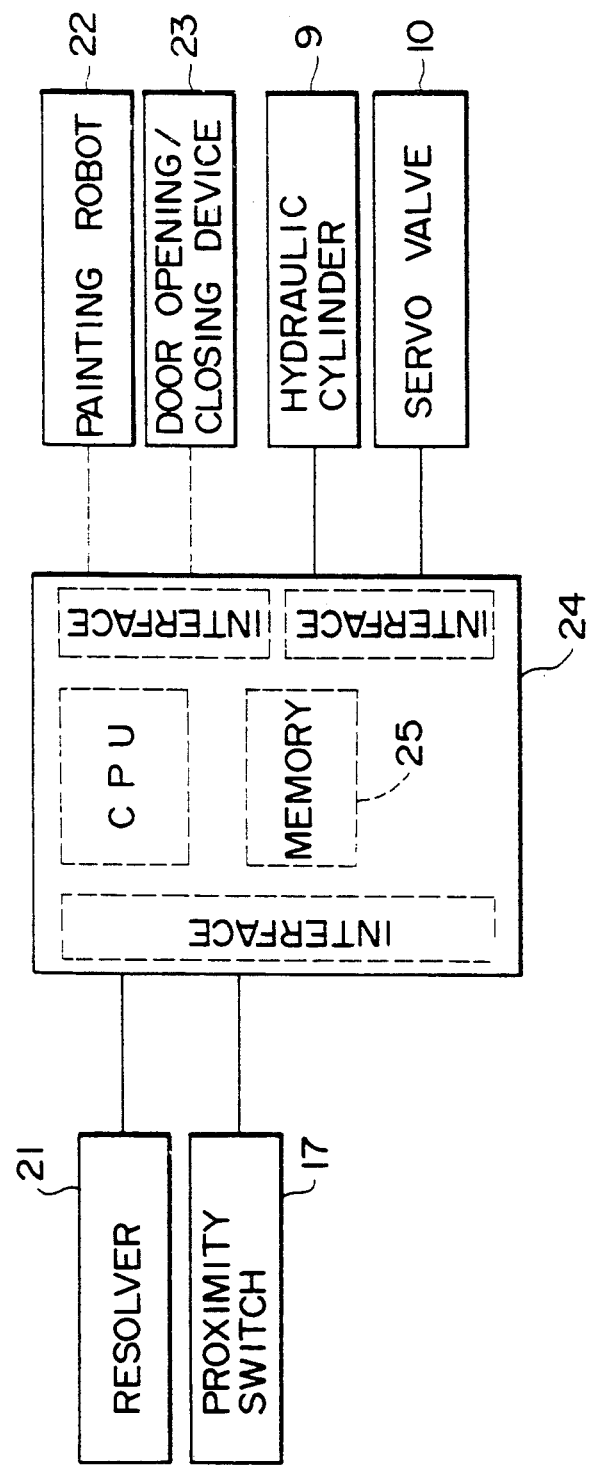
FIG. 2 is a schematic block diagram of a control system of the door open position fixing device.
Figure 4A:
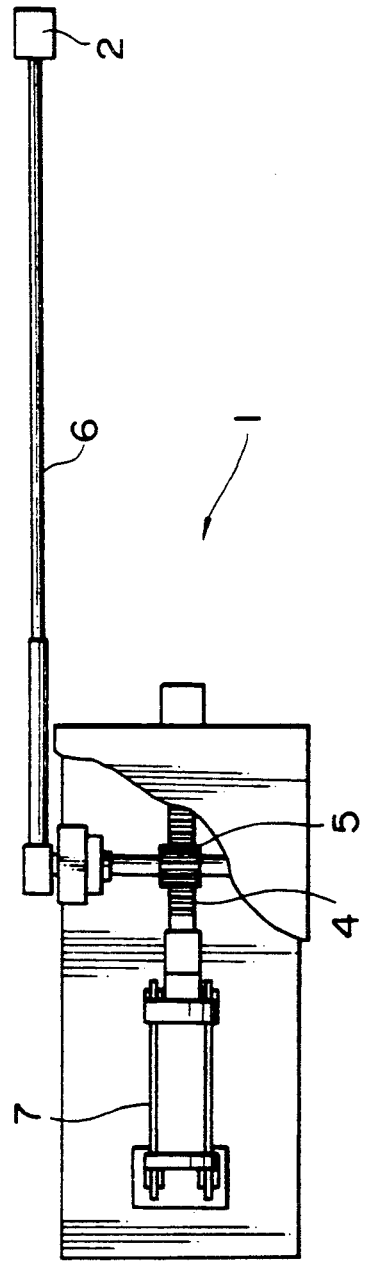
FIG. 4A is a plan view of the door open position fixing device in the prior art.
Figure 4B:
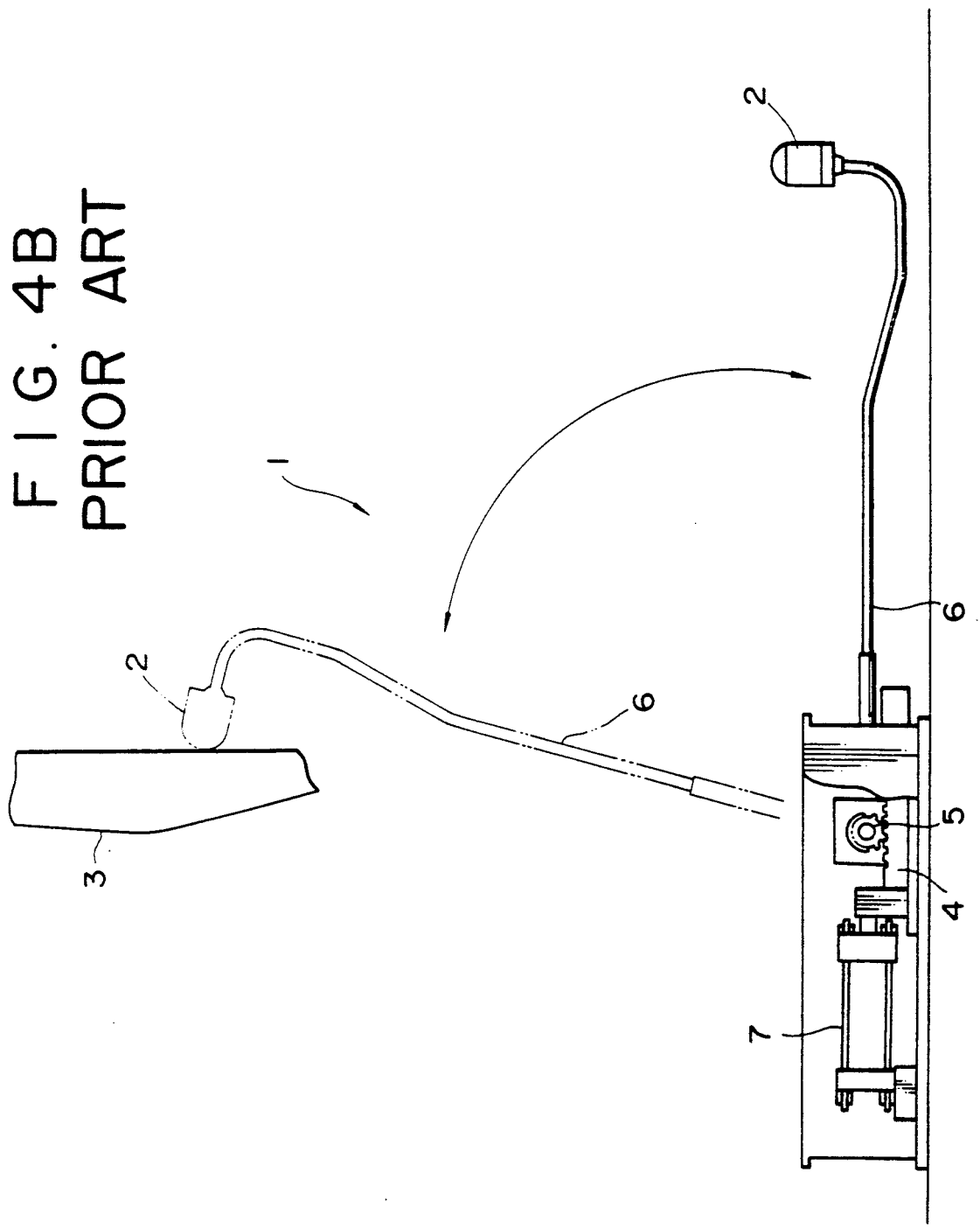
FIG. 4B is a side view of FIG. 4A.

Referring to FIGS. 1A and 1B, reference numeral 8 generally designates a door open position fixing device including a hydraulic cylinder 9 adapted to be servo-controlled through a servo valve 10 as shown in FIG. 2.

A rack 12 is connected to a ram 11 of the hydraulic cylinder 9. A pinion gear 13 meshes with the rack 12. A swing lever 15 is fixed at one end thereof to a rotating shaft 14 on which the pinion gear 13 is mounted. A presser member 16 formed of urethane resin, for example, is mounted at the other end of the swing lever 15.

The presser member 16 serves to abut against an open door (not shown) and press the door in an opening direction thereof, thereby maintaining an open condition of the door. The abutment of the presser member 16 against the door is detected by a proximity switch 17 provided in the presser member 16.

Thus, a driving mechanism 18 for swingably driving the presser member 16 is constituted of the hydraulic cylinder 9, the rack 12, the pinion gear 13, the rotating shaft 14 and the swing lever 15.

A gear 19 is also mounted on the rotating shaft 14, and a gear 20 meshes with the gear 19. A resolver 21 is mounted to the gear 20.

The resolver 21 serves to detect a swing angle (swing degree) of the presser member 16. The resolver 21 may be replaced by an encoder, for example.

The operation of the door open position fixing device 8 will now be described with reference to FIG. 3 showing a procedure of maintaining an open condition of the door.

In FIG. 3, reference numbers S1 to S4 denote operation steps.

These operation steps S1 to S4 are executed in accordance with a processing program preliminarily stored in a memory 25 incorporated in a control unit 24 for controlling a painting robot 22 for painting a body of an automobile (not shown) and a door opening/closing device 23 for opening and closing the door mounted to the body of the automobile (see FIG. 2).

First, when the automobile placed on a carriage (not shown) is stopped at a given painting position on a production line, the door of the automobile is opened by the door opening/closing device 23 (S1).

Then, the hydraulic cylinder 9 is operated through the servo valve 10 (S2).

As a result, the ram 11 of the hydraulic cylinder 9 is expanded to rotate the pinion gear 13 through the rack 12. Accordingly, the presser member 16 is driven through the rotating shaft 14 and the swing lever 15 to swing upwardly.

When the presser member 16 comes to abutment against an inner surface of the door, and a swing angle of the swing lever 15 (i.e., a swing angle of the presser member 16) detected by the resolver 21 becomes equal to a predetermined value which is preliminarily set for every door of different kinds (S3), the hydraulic cylinder 9 is stopped (S4).

In this case, the above predetermined value is set to a value such that the open door can be fixed at a position where the variation of an opening angle is at the maximum in each door. Accordingly, the door can be opened at this position by a predetermined pressure applied by the presser member 16 until an optimum opening angle, without damaging each door.

An optimum swing angle of the presser member 16 for every door is preliminarily stored in the memory 25, and it is read from the memory 25 in the predetermined order of production of the automobiles of different kinds.

The swing angle and a swing speed of the swing lever 15 (i.e., the presser member 16) can be easily changed by operating an operation panel (not shown) of the control unit 24.

The open condition of the door at the predetermined angle can be confirmed on the basis of a detection signal from the proximity switch 17 detecting the abutment of the presser member 16 against the door and an output value from the resolver 21 corresponding to the swing angle of the swing lever 15.

In this preferred embodiment, the control means for controlling the driving mechanism 18 so that the swing degree of the presser member 16 detected by the resolver 21 becomes equal to the predetermined value preliminarily set for every door of different kinds is constituted of the control unit 24 incorporating the memory 25 storing the processing program for executing the steps S2 to S4.

After the door is fixed at the predetermined open position as mentioned above, the inner surface of the door as well as the inside of the body of the automobile is painted by the painting robot 22.

After the painting operation by the painting robot 22 is completed, the swing lever 15 is returned to the original position.

Thus, by using the door open position fixing device 8 according to the preferred embodiment, the open condition of every door can be maintained at the optimum open position in accordance with an opening angle and a mounting structure of every door.

Further, in the door open position fixing device according to the present invention, the hydraulic cylinder 9 may be replaced by an air cylinder having a position detecting function or a servo motor of any kind.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A door open position fixing device including:
   a presser member comprising means to abut against a vehicle door openable up to a predetermined angle, said predetermined angle being different for vehicles of different kinds;
   a driving mechanism for swingably driving said presser member to make said presser member press said door in an opening direction thereof and maintain an open condition of said door;
   detecting means for detecting a swing degree of said presser member; and
   control means for storing said predetermined angle for different kinds of vehicles, for reading said predetermined angle from said storing means, for comparing the detected swing angle with the predetermined angle and for controlling said driving mechanism to swingably drive said presser member so as to press said door in the opening direction until said swing degree of said presser member detected by said detecting means becomes equal to said predetermined angle.

2. The door open position fixing device as defined in claim 1, wherein said detecting means comprises a resolver for detecting a swing angle of said presser member.

* * * * *